June 6, 1933.   D. G. BLATTNER ET AL   1,912,426
ELECTRIC METER
Filed Aug. 12, 1931   2 Sheets-Sheet 1

INVENTORS D. G. BLATTNER
H. F. HOPKINS
BY
*G. M. Campbell*
ATTORNEY

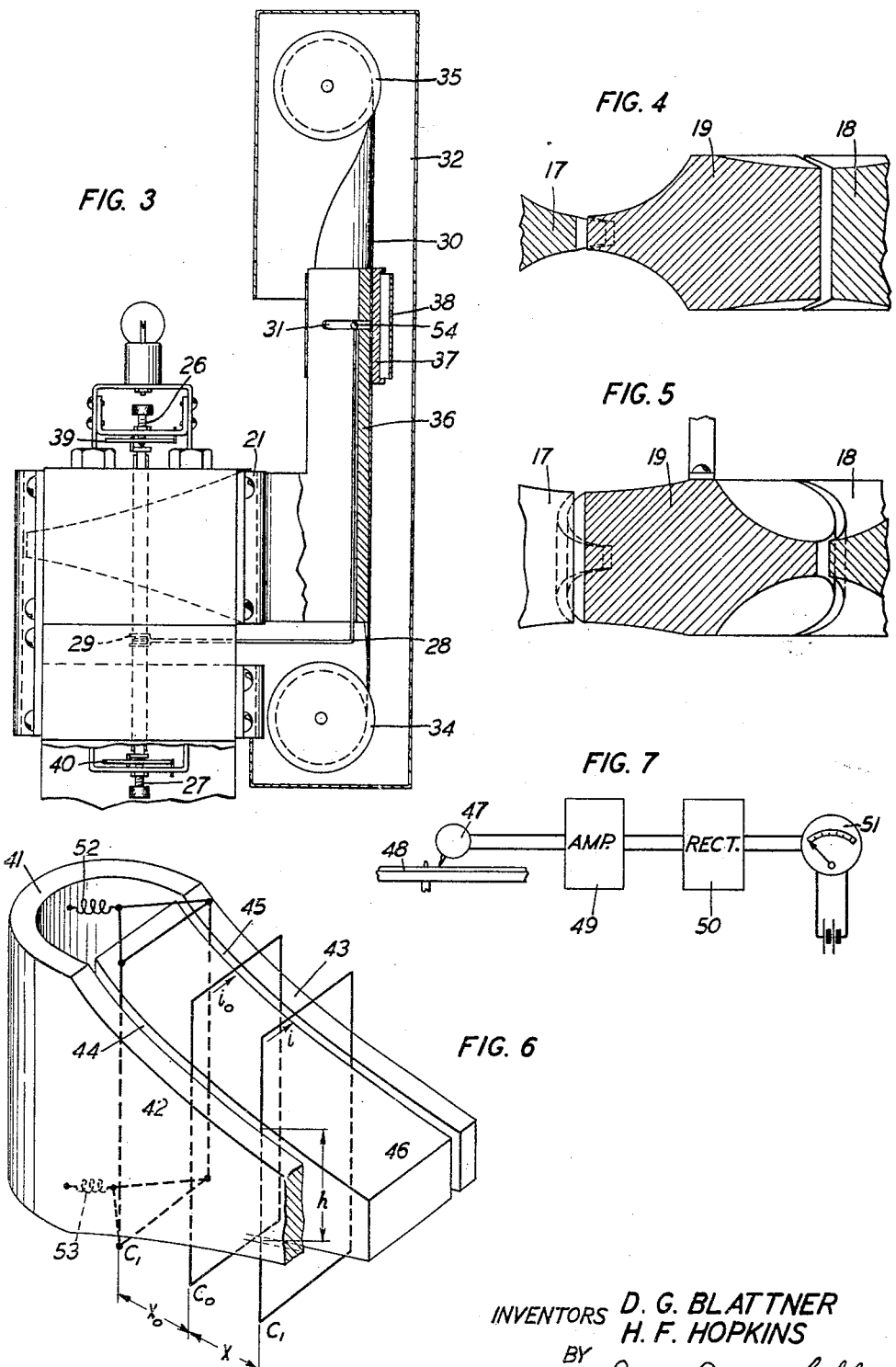

Patented June 6, 1933

1,912,426

UNITED STATES PATENT OFFICE

DAVID G. BLATTNER, OF MOUNTAIN LAKES, AND HARRIS F. HOPKINS, OF BOGOTA, NEW JERSEY, ASSIGNORS TO BELL TELEPHONE LABORATORIES, INCORPORATED, OF NEW YORK, N. Y., A CORPORATION OF NEW YORK

ELECTRIC METER

Application filed August 12, 1931. Serial No. 556,500.

This invention relates to electric meters and more particularly to direct current operated meters for transmission testing.

In testing the transmission efficiency of electrical circuits or devices such as transmitters, receivers, phonograph reproducers, etc., it is common practice to rectify the transmitted currents of voice frequencies and measure them with a volume indicator device which is essentially a direct current moving coil ammeter giving a deflection proportional to the strength of the currents in the coil. The transmission or recording engineer however is not so much interested in the absolute values of the currents indicated on such a meter as in the transmission or the corresponding number of decibels gain (or loss) with respect to some reference value. It is therefore common practice to convert such current readings into decibels or db. which units are defined by the relation $$N = 20 \log_{10} \frac{I_1}{I_2}$$

where N is the number of decibels by which the currents $I_1$ and $I_2$ differ.

It has been proposed heretofore to calibrate such devices directly in decibels but due to the logarithmic variation of the current as expressed in the above equation and db. range of the instrument is very limited and the scale is non-uniform and hence cannot be read to the same degree of accuracy throughout. Several schemes have been proposed for overcoming this difficulty one of which is to supply the meter with a current which varies logarithmically with respect to the current to be measured. According to another arrangement the scale is inclined to its normal position so that a uniform scale may be used but neither of these devices is entirely satisfactory for the purpose.

It is therefore the object of this invention to provide a meter in which equal variations in current supplied to it, expressed in the desired logarithmic units, cause equal displacements of the moving system of the meter which are registered on a uniform scale.

Broadly speaking the invention comprises a moving coil carrying an indicating device and adapted to be moved by the interaction of the current in the coil with a magnetic field in which the flux is distributed in such a way that the change in flux linkages for unit displacements of the coil as the indicator moves across the scale from the initial position becomes progressively smaller in accordance with the relation of the units to be measured to changes in current in the coil.

The flux may be distributed in various ways according to the invention such as by shaping the faces of the magnetic members between which the moving element moves or by varying the length of air gap between these members in the proper manner or by a combination of both of these features. The preferred structure is made along the general lines of a moving coil ammeter and the proper flux distribution is obtained by varying the height of the magnetic members but the range of such an instrument can be extended somewhat by varying the length of the gap as well. The meter may be made with an ordinary indicating scale and pointer or as a recording device having a light source which casts a shadow of the pointer tip on suitably calibrated, sensitized paper moving across the line of travel of the pointer. In either case the moving element is preferably critically damped in a suitable manner such as by a short-circuited coil in a constant field and mounted integrally with the moving element.

Referring now to the drawings,

Fig. 3 is a side view of the meter partly in section;

Figs. 4 and 5 are detailed views of the magnetic circuit;

Fig. 6 is a graphical form of a meter according to this invention, and

Fig. 7 illustrates one application of the invention.

Figure 1:
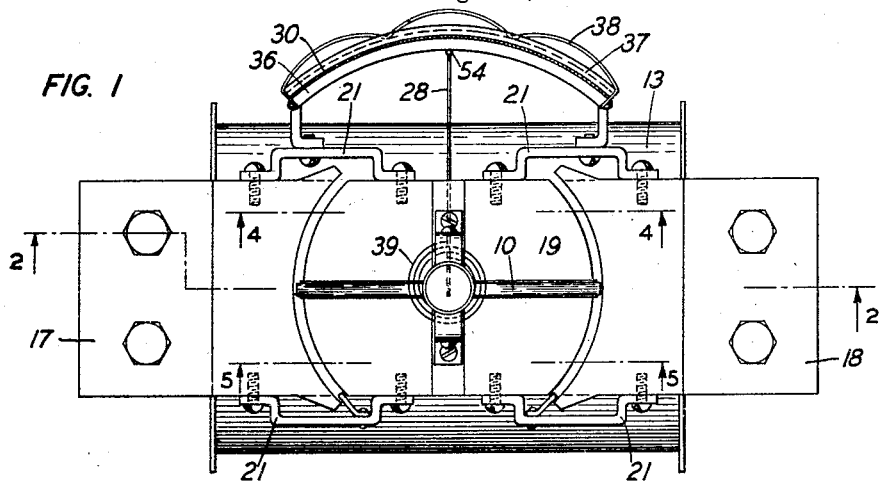
Fig. 1 is a plan view of a practical form of a meter according to this invention.
Figure 2:
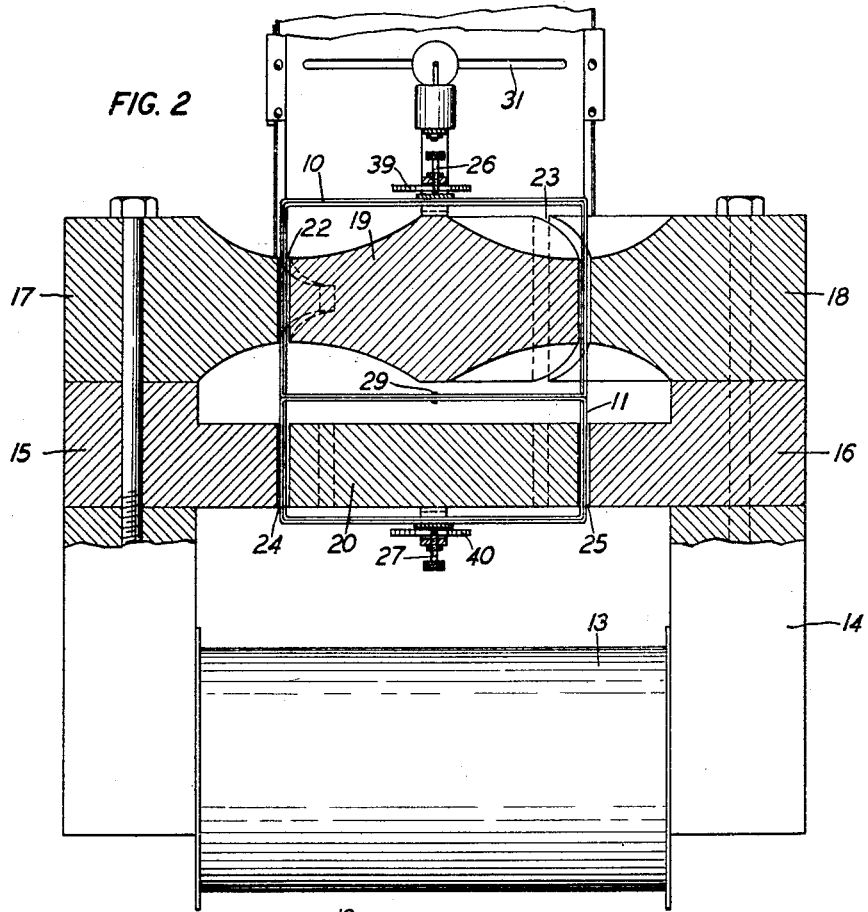
Fig. 2 is a section of the meter of Fig. 1 along the line 2—2.

In the meter shown in Figs. 1, 2 and 3 the magnetic fields for the signal current coil 10 and the damping coil 11 are provided by an electromagnet 12 consisting of a coil 13 wound on a U-shaped core 14. Secured to this core are pole-pieces 15, 16 for the damping coil and 17, 18 for the signal coil and between these sets of pole-pieces magnetic members 19 and 20 are held in the positions shown by suitable brackets 21 to form short working gaps 22, 23 and 24, 25 for the coils 10 and 11.

To keep the mass of the moving system low, the coils 10 and 11 are made sufficiently rigid to maintain their shape without the use of supporting forms and they are secured together to move as a unit about their pivot screws 26, 27 carried by the members 19 and 20. An indicating needle 28 is attached at 29 to the junction of the coils at the axis of their rotation. In an indicating meter, this needle would terminate directly in front of a suitable scale calibrated uniformly in decibels but the meter shown is adapted to record photographically on the film 30 which is moved past the slot 31 by suitable clockwork mechanism in the upper part of the reel housing 32.

For this purpose a lamp 33 mounted on the member 19 projects a beam of light which exposes the film as it passes the slot 31. The tip 54 of the needle 28 terminates opposite the slot, moves across it in accordance with the movements of the coil 10 and casts a shadow which leaves a continuous trace on the film 30 representing the current variations measured in decibels. In passing from the reel 34 to the reel 35 the film passes between guide plates 36, 37 which are preferably curved so that all points on the section of film passing the slot 31 are equidistant from the axis of the coil, the plate 37 being removably held in position by the spring 38.

While the coil for purposes of easy illustration has been shown in the midposition, its normal position as determined by restoring springs 39, 40 is such that the needle tip 54 is at the left side of the film as viewed in Fig. 1. The coil will then be opposite the thick portions of the pole-pieces 17 and 18 and as the current in the coil is increased by equal increments the clockwise deflections of the coil will be progressively smaller due to the tapered pole faces so that the reading indicated on the film is proportional to $20 \log_{10} i$ where $i$ is the current in the coil.

Figs. 4 and 5 taken on the lines 4—4 and 5—5 respectively in Fig. 1 show more clearly the tapering of the faces of the poles 17 and 18 and the magnetic member 19 to give the above relation of current to deflection. The resistance and the number of turns in the damping coil 11 are preferably correlated to the strength of flux in the gaps 24 and 25 to critically dampen the movements of the coil 10 in accordance with common practice in meter design.

The tapered construction of the magnetic circuit may be more readily understood from the equivalent graphic form of the instrument shown in Fig. 6. In this figure, a magnet 41 is provided with pole tips 42, 43 separated by two air gaps 44, 45 and a core member 46. The conductor is shown in the form of a coil of $n$ turns which when carrying a current $i$ is located at a position $C'$ where the vertical height of the pole tips is $h$. The displacement of the coil is opposed by two springs 52, 53 attached to the four corners of the coil. The springs are so designed that for a reference current, $i_o$, the coil will be located at positions $C_o$ and for a current of zero at $C_1$. Assume positions $C'$ and $C_1$ of the coil to be $x$ and $x_o$ centimeter respectively from position $C$ measured along the axis of the core P. It is obvious that with the current, $i$ in the coil located at the position $C'$ the displacing force F will be $$F = \frac{2 \varphi\, h\, n\, i}{10} \quad (1)$$

where $i$ is in amperes and F in dynes, $\varphi$ being flux density in gausses.

If the spring constant for the two springs 52, 53 is $k$ dynes/cm., then for the position $C'$ of the coil the restoring force $F'$ is $$F' = k\,(x + x_o) \quad (2)$$

and since the coil is assumed to be at rest at position $C'$ under the action of the two forces $$k\,(x + x_o) = \frac{2\,\varphi\, h\, n\, i}{10} \quad (3)$$

It can likewise be shown that for a current $i_o$ $$k x_o = \frac{2\,\varphi\, h_o\, n\, i_o}{10} \quad (4)$$

so that from Equations (3) and (4)

$$\frac{h}{h_o} = \frac{(x + x_o)}{(x_o)} \frac{i_o}{i} \quad (5)$$

Since the deflection of the coil is to bear a linear relation to the logarithm of the current, it will be convenient in Equation (5) to express $i$ in terms of $i_o$ thus $$\frac{i_o}{i} = 10^{-.05U}$$

where $$U = 20 \log_{10} \frac{(i_o)}{(i)}$$

so that $$\frac{h}{h_o} = \frac{(x + x_o)}{x_o} 10^{-.05U} \quad (6)$$

Since a db. is to be represented as a certain scale deflection, it is clear that U in Equation (6) is a function of $x$. Therefore, the ratio $$\frac{h}{h_o}$$

representing the height of the pole tips for any particular position of the coil in terms of the initial height will not have a simple curved outline as indicated in Fig. 1 unless $x_o$ has a value equal to or greater than a certain critical one. The coil displacement $x_o$ should, however, not be greater than necessary in order that the ratio of $$\frac{h}{h_o}$$

be not excessive. The critical value of $x_o$ is best determined by equating to zero the derivative of $h$ in the Equation (6) with respect to $x$ after expressing U in terms of scale length. As a matter of convenience, therefore, we will assume that 1 db. shall represent a coil displacement of .2 cm. so that U in Equation (6) can be represented as $$U = \frac{x}{.2}$$

and $$\frac{dh}{dx} = \frac{d\left[\frac{h_o(x+x_o)10^{-0.25x}}{x_o}\right]}{dx} = 0 \quad (7)$$

from which $x_o = 1.737$ cm. when $x = 0$. This value of $x_o$ when substituted in Equation (6) gives the height of the pole tips for various positions of the coil as follows:

| U | $\frac{h}{h_o}$ |
|---|---|
| 0 db. | 1.000 |
| 1 | .995 |
| 2 | .977 |
| 4 | .923 |
| 6 | .849 |
| 10 | .680 |
| 15 | .485 |
| 20 | .330 |
| 25 | .218 |
| 30 | .141 |

From the above table it is evident that a meter of this type can be constructed within the limits of practical pole-piece dimensions to cover a range of 30 db. Such a meter is ordinarily used to measure the open circuit voltage of some transmitting device under varying conditions. One common application is illustrated in Fig. 7 in which the response of the phonograph pick up device 47 is being measured at various frequencies. The pick up cooperates with a record 48 upon which are impressed various single sound frequencies in predetermined sequence. The output of the device is associated with the input circuit of an amplifier 49 which has its output circuit connected to a rectifier 50 capable of delivering to the db. meter 51 which has a uniform scale, a direct current which is directly proportional to the voltage generated by the pick up device. It has been found that this linear relation may be obtained with sufficient accuracy for currents up to .3 to .5 milliampere by using a coupling resistance between the amplifier and the rectifier which is large compared with the internal resistance of the rectifier which varies with the current.

To complete the essential features of the design of such a meter, it is only necessary to correlate the valve of current representing the full scale deflection with the constant $K$ of the restoring springs 52, 53 and the number of turns in the coil in accordance with Equation (3) above. If .2 cm. deflection represents 1 db., then $X = 6$ for a 30 db. scale. $X_o = 1.737, i = .3$ milliampere and $$\frac{h}{h_o}$$

At full scale position is .141 then in accordance with equation (3)

$$K = \frac{6(.141 \; \varphi \; h_o \; n) \; 10^{-4}}{77.37}$$

$$= 1.092 \times 10^{-6} \; \varphi \; h_o \; n \; \text{dynes/cm.}$$

While this design has been developed for the graphical form of the meter shown in Fig. 6, the above equations obviously all apply also to the more practical form shown in Fig. 1 provided they are interpreted as applying to the gap of the magnetic system. The remaining details of the meter such as the bearings, the casing etc. may be made in accordance with well known principles and are not described since they form no part of the present invention.

It will also be understood that various modifications in the meter as described may be made within the scope of the invention, for example, the reference current may be such as to give the maximum deflection instead of the minimum deflection in which case the needle 28 of Fig. 1 would move from right to left across to scale to register 30 db. transmission loss with respect to the reference level instead of gain as in the meter described. Various other possible modifications will occur to those skilled in the art but the invention is intended to be limited only by the following claims.

What is claimed is:

1. In a transmission measuring device, a magnetic circuit having pole faces defining a gap and tapered in height throughout substantially their entire width to give a non-linear distribution of flux in the gap, a coil energized by the currents transmitted rotatably mounted within the gap, means attached to the coil for critically damping its movements, a uniform decibel scale and means carried by the coil for indicating its position on the scale.

2. In an electrical transmission meter, a pivoted coil carrying a varying current, a magnetic circuit and restoring means for the coil and pole faces in the magnet circuit adjacent the coil varying in height with respect to their width according to the logarithm of the current required to move the coil across the pole faces and the force on the coil exerted by the restoring means.

3. A transmission meter according to claim 2 having means for recording the movements of the coil.

4. In a transmission measuring device, a movable element energized by the currents transmitted, a magnetic circuit providing flux for the element and having pole faces tapered in the direction in which the element moves so that one decibel variation in the transmission produces substantially the same deflection over the working range of the element, a record strip, a needle attached to the element having a tip portion adjacent the strip and means for projecting a shadow of the tip portion of the needle on the record strip.

In witness whereof, we hereunto subscribe our names, this 10th day of August, 1931.

DAVID G. BLATTNER.
HARRIS F. HOPKINS.